US008737397B2

(12) United States Patent
Bijwaard et al.

(10) Patent No.: US 8,737,397 B2
(45) Date of Patent: May 27, 2014

(54) METHOD FOR CONVERTING BETWEEN UNICAST SESSIONS AND MULTICAST SESSION

(75) Inventors: Dennis Bijwaard, Enschede (NL); Ko Lagerberg, Hengelo (NL)

(73) Assignee: Alcatel Lucent, Paris (FR)

( * ) Notice: Subject to any disclaimer, the term of this patent is extended or adjusted under 35 U.S.C. 154(b) by 325 days.

(21) Appl. No.: 13/021,211

(22) Filed: Feb. 4, 2011

(65) Prior Publication Data

US 2011/0122873 A1 May 26, 2011

Related U.S. Application Data

(63) Continuation of application No. 11/315,775, filed on Dec. 22, 2005, now Pat. No. 7,889,732.

(51) Int. Cl.
*H04L 12/28* (2006.01)
*H04L 12/56* (2011.01)
*H04L 12/18* (2006.01)

(52) U.S. Cl.
CPC .......... *H04L 12/185* (2013.01); *H04L 12/1877* (2013.01); *H04L 12/189* (2013.01)
USPC ....................................... 370/390

(58) Field of Classification Search
None
See application file for complete search history.

(56) References Cited

U.S. PATENT DOCUMENTS

| 6,704,576 B1 | 3/2004 | Brachman et al. |
| 6,977,891 B1 | 12/2005 | Ranjan et al. |
| 6,996,630 B1 | 2/2006 | Masaki et al. |
| 7,082,142 B1 | 7/2006 | Begeja |
| 7,149,195 B2 | 12/2006 | Kall et al. |
| 7,889,732 B2 | 2/2011 | Bijwaard et al. |
| 2003/0225845 A1 | 12/2003 | Hong |
| 2004/0042479 A1 | 3/2004 | Epstein et al. |
| 2005/0132000 A1 | 6/2005 | Richardson et al. |

(Continued)

FOREIGN PATENT DOCUMENTS

| EP | 1434385 | 6/2004 |
| JP | 2005276079 A | 10/2005 |

OTHER PUBLICATIONS

J. Rosenberg, H. Schulzrinne, G. Camarillo, A. Johnston, J. Peterson, R. Sparks, M. Handley and E. Schooler, Request for Comments 3261—SIP: Session Initiation Protocol, Jun. 2002, Internet Engineering Task Force, pp. 8-14, and 83-92.*

(Continued)

*Primary Examiner* — John Blanton
*Assistant Examiner* — Christopher Crutchfield
(74) *Attorney, Agent, or Firm* — Wall & Tong, LLP

(57) ABSTRACT

The invention includes methods for converting between a plurality of unicast sessions and a multicast session. A method for converting from unicast sessions to a multicast session includes receiving a request for establishing a unicast session for delivering content to a first client device, generating a multicast session establishment message adapted for establishing a multicast session with the client device for delivering the content to the client device, and generating at least one multicast session join message for the other client devices, the at least one multicast session join message adapted for enabling the other client devices to join the multicast session. The multicast session establishment message is generated using a threshold number of unicast sessions. A method for converting from a multicast session to a unicast session is provided. A method for converting from a plurality of unicast sessions to a plurality of multicast sessions is provided.

20 Claims, 5 Drawing Sheets

(56) References Cited

U.S. PATENT DOCUMENTS

| | | | |
|---|---|---|---|
| 2005/0259584 A1* | 11/2005 | Chen et al. | 370/238 |
| 2006/0047845 A1 | 3/2006 | Whited et al. | |
| 2006/0075428 A1 | 4/2006 | Farmer et al. | |
| 2006/0161625 A1 | 7/2006 | Norp et al. | |
| 2006/0200574 A1 | 9/2006 | Pickens et al. | |
| 2006/0221859 A1 | 10/2006 | Bijwaard et al. | |
| 2006/0268873 A1 | 11/2006 | Tonjes et al. | |
| 2007/0168523 A1* | 7/2007 | Jiang et al. | 709/228 |

OTHER PUBLICATIONS

Author Unknown, The 3GPP ESTI TS 123.246, Version 6.5.0, Published Dec. 2004, pp. 1-46.*

J. Rosenberg, F. Robert, RE: [Sip] Discussion: Mixing unicast/multicast in offer/answer, discussion of the SEP mailing list, Aug. 23, 2001, pp. 1-2.*

Author Unknown, 3GPP TR 23.846, Version 6.1.0, Third Generation Partnership Project, Technical Specification Group Services and System Aspects, Multimedia Broadcast/Multicast Service, Architecture and Functional Description, Release 6, Dec. 2002, pp. 1-114.*

U.S. Appl. No. 11/096,218, filed Mar. 31, 2005, Method and Apparatus for Managing a Multicast Tree, D. J. A. Bijwaard 2-2.

International Search Report and the Written Opinion of the international Searching Authority in PCT/US2006/047880; dated Jun. 28, 2007; Lucent Technologies, Inc., Applicant.

"On the issue of switching between p2p- and p2m- channels in MBMS," Joint 3GPP TSG RAN WG2 and WG3 on MBMS, Jan. 15, 2003, pp. 1-3, XP002292829, p. 1.

ETSI: Universal Mobile Telecommunications System (UMTS): ETSI Standards, European Telecommunications Standards Institute, Sophia-Antipo, FR, Dec. 31, 2004, pp. 1-58, XP002337459, ISSN : 0000-0001, Paragraph [5.2.5], Paragraph [8.1.2]—Paragraph [8.1.3].

J. Rosenberg, et al., Request for Comments 3621—SIP:Session initiation Protocol, Jun. 2002, Internet Engineering Task Force, pp. 1-95.

Examiner's Office Letter in Japanese Patent Application No. 2008-547346, Alcatel-Lucent USA Inc., Applicant, mailed May 9, 2011, 2 pages.

Office Action in Chinese Application No. 200680048736.X, Lucent Technologies Inc., Applicant, mailed Aug. 18, 2011, 11 pages.

* cited by examiner

METHOD FOR CONVERTING BETWEEN UNICAST SESSIONS AND MULTICAST SESSION

CROSS-REFERENCE TO RELATED APPLICATION

This application is a continuation of application Ser. No. 11/315,775, filed on Dec. 22, 2005 now U.S. Pat. No. 7,889,732, Dennis Bijwaard et al. inventors, entitled METHOD FOR CONVERTING BETWEEN UNICAST SESSIONS AND A MULTICAST SESSION, which application is incorporated herein by reference.

FIELD OF THE INVENTION

The invention relates to the field of communication networks and, more specifically, to management of unicast sessions and multicast sessions.

BACKGROUND OF THE INVENTION

In general, use of multiparty applications (e.g., live audio/video streaming) in existing networks may be supported using either multiple unicast connections or a multicast connection. For example, multiple parties may receive the same multiparty content using multiple respective unicast connections, respectively. Disadvantageously, however, use of unicast connections results in substantial bandwidth waste. Similarly, for example, multiple parties may receive the same multiparty content using a multicast connection. Disadvantageously, however, use of multicast connections requires numerous multicast routers which may be expensive to purchase, configure, and maintain.

SUMMARY OF THE INVENTION

Various deficiencies in the prior art are addressed through the invention of a method for converting between a plurality of unicast sessions and a multicast session.

A method for converting from unicast sessions to a multicast session includes receiving a request for establishing a unicast session for delivering content to a first client device, generating a multicast session establishment message adapted for establishing a multicast session with the client device for delivering the content to the client device, and generating at least one multicast session join message for the other client devices, the at least one multicast session join message adapted for enabling the other client devices to join the multicast session. The multicast session establishment message is generated in response to a determination that a threshold number of other unicast sessions exist for delivering the content to a threshold number of other client devices.

A method for converting from a multicast session to a unicast session includes receiving a message terminating an association of a first client device with the multicast session, and, in response to a determination that a threshold number of other client devices are associated with the multicast session, generating at least one unicast session join message for the other client devices, the at least one unicast session join message adapted for enabling the other client devices to establish respective unicast sessions.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables conversion of individual unicast sessions into a multicast session (or, alternatively, conversion of a multicast session into individual unicast sessions). The present invention maintains a unicast session threshold such that, when the unicast session threshold is satisfied (i.e., N unicast sessions exists for particular content requested from a content provider), detection of another unicast session request (i.e., for establishing an (N+1)th unicast session) triggers establishment of a multicast session, determination of the original unicast sessions established for the requested content, and conversion of the identified original unicast sessions to the multicast session (i.e., joining the identified original unicast sessions to the newly established multicast session).

Figure 1:
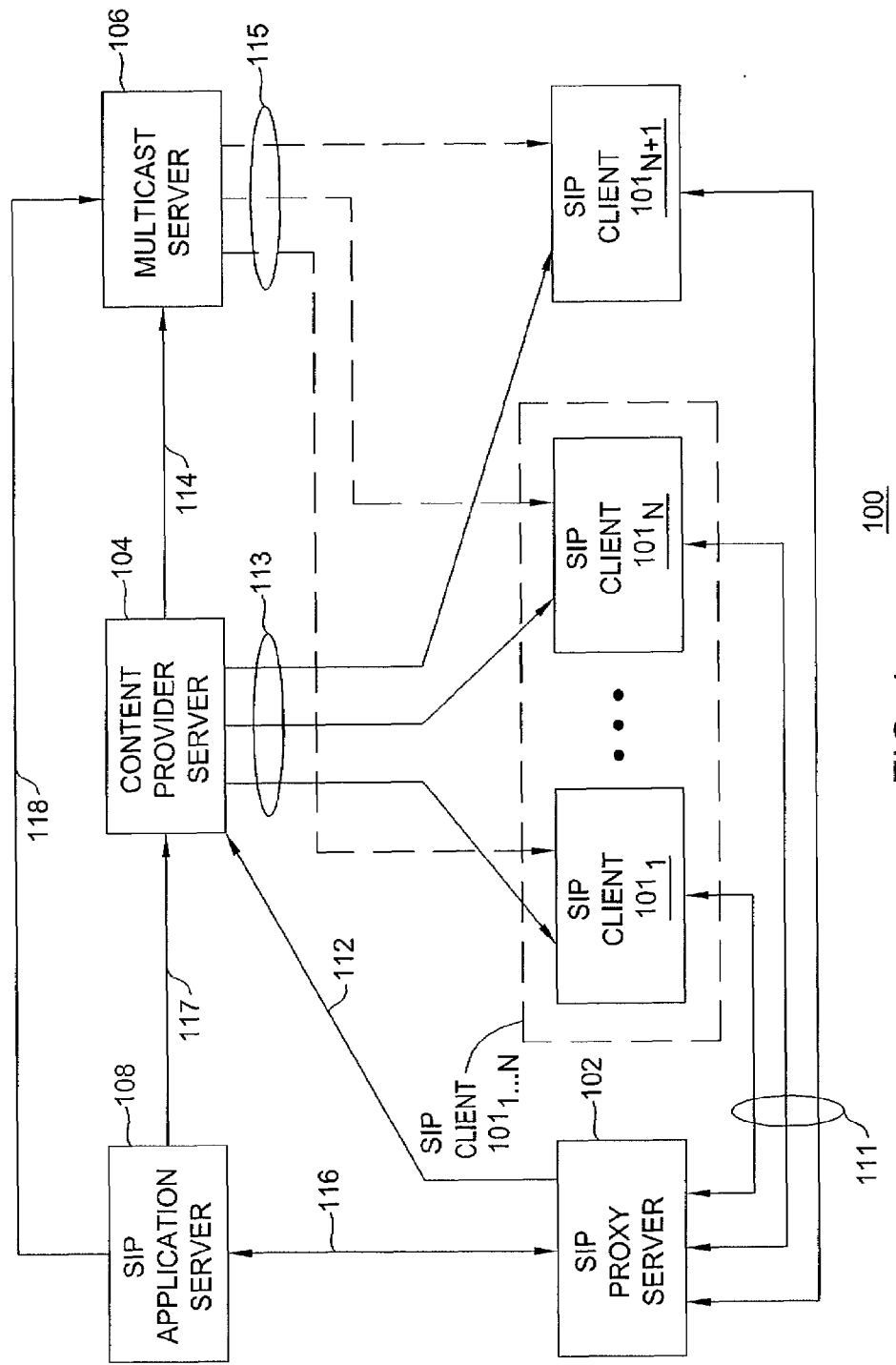
FIG. 1 depicts a high-level block diagram of a communications network architecture.

FIG. 1 depicts a high-level block diagram of a communication network architecture. As depicted in FIG. 1, communication network architecture 100 includes a plurality of SIP clients $101_1$-$101_N$ and $101_{N+1}$ (collectively, SIP clients 101), a SIP proxy server 102, a content provider server 104, a multicast server 106, and a SIP application server 108. In general, SIP is a protocol for initiating, modifying, and terminating interactive user sessions supporting various combinations of voice, video, instant messaging, presence information, online games, and like multimedia content. As such, SIP clients 101 include any devices operable for receiving and presenting multimedia content from content provider server 104 (e.g., SIP phones, computers, and the like). In one embodiment, SIP clients 101 comprise SIP User Agents (SIP-UAs).

For purposes of clarity, SIP clients $101_1$-$101_N$ are depicted herein as one SIP client $101_{1...N}$ (where N is greater than or equal to one). As such, although single connections are depicted between SIP client $101_{1...N}$ and other network elements of FIG. 1, those skilled in the art will appreciate that when SIP client $101_{1...N}$ represents a plurality of SIP clients, each connection is repeated a corresponding plurality of times (i.e., N connections exist for N SIP clients). For example, those skilled in the art will appreciate that when SIP client $101_{1...N}$ represents a plurality of SIP clients, the single unicast session (or single multicast session branch) depicted as being associated with SIP client $101_{1...N}$ represents a corresponding plurality of unicast sessions (or a corresponding plurality of multicast session branches).

The SIP proxy server 102 enables SIP clients 101 to establish indirect network connections with network services (illustratively, content provider server 104, multicast server 106, SIP application server 108, and the like), thereby enabling messaging between SIP clients 101 and the network services. For example, SIP clients 101 may connect to SIP proxy server 102 for requesting sessions, information, or various other resources available on other servers (e.g., content provider server 102, multicast server 106, SIP application server 108, and the like). In one embodiment, SIP proxy server 102 may alter client requests or server responses for various purposes.

The content provider server 104 streams multimedia content (e.g., voice, video, instant messaging, presence information, online games, and the like). The content provider server 104 is operable for streaming multimedia content directly to SIP clients 101 using unicast sessions. In one embodiment, content provider server 104 streams multimedia content to multicast server 106 for distribution to SIP clients 101 using multicast sessions. The content provider server 104 responds to requests for content by establishing sessions with client devices for conveying content to the client devices. In one embodiment, content provider server 104 operates as a SIP-UA adapted for establishing and running multiple SIP sessions, and associated multimedia content streams, in parallel.

The multicast server 106 is adapted for supporting a unicast session with content provider server 104 for receiving content from content provider server 104, and supporting a multicast session with SIP clients 101 for multicasting the content to SIP clients 101. The multicast server 106 is adapted for being configured as a multicast source. The SIP application server 108 hosts and executes services for performing various functions (e.g., responding to requests from SIP clients 101, SIP proxy server 102, content provider server 104, and like network components). In one embodiment, for example, SIP application server 108 is adapted for generating, forwarding, and responding to SIP messages (e.g., SIP INVITE messages, SIP RE-INVITE messages, and the like). In one embodiment, for example, SIP application server 108 is adapted for using multicast server 106 as a multicast source supporting multicast sessions with SIP clients 101.

As depicted in FIG. 1, SIP clients 101 communicate with SIP proxy server using a plurality of paths 111 (collectively, paths 111), SIP proxy server 102 communicates with content provider server 104 using a path 112, content provider server 104 communicates with SIP clients 101 using a plurality of paths 113 (collectively, paths 113), content provider server 104 communicates with multicast server 106 using a path 114, multicast server 106 communicates with SIP clients 101 using a plurality of paths 115 (collectively, paths 115), SIP proxy server 102 communicates with SIP application server 108 using a path 116, SIP application server 108 communicates with content provider server 104 using a path 117, and SIP application server 108 communicates with multicast server 106 using a path 118. The paths 111-118 comprise communication paths for supporting SIP signaling, data streaming, and like communications required for supporting the present invention.

In different embodiments of the present invention, combinations of SIP clients 101, SIP proxy server 102, content provider server 104, a multicast server 106, and a SIP application server 108 may be used for converting unicast sessions to one or more multicast sessions. Similarly, in different embodiments of the present invention, combinations of SIP clients 101, SIP proxy server 102, content provider server 104, a multicast server 106, and a SIP application server 108 may be used for converting a multicast session to a plurality of unicast sessions. Although depicted and described herein as supporting specific functions, SIP clients 101, SIP proxy server 102, content provider server 104, multicast server 106, and SIP application 108 may support various other functions for implementing different embodiments of the present invention.

In one embodiment, the present invention utilizes a unicast session threshold (denoted as N) for determining whether a transition from a plurality of unicast sessions to a multicast session is performed. In one embodiment, at least one network element maintains the unicast session threshold. In one embodiment, unicast session threshold is associated with particular content requested from content provider server 104. In one embodiment, the unicast session threshold is static. In another embodiment, unicast session threshold is dynamic. In one such embodiment, the unicast session threshold may be changed based on cost changes, resource availability, and the like.

Upon receiving a session establishment request from a SIP client for establishing a session to that SIP client, a determination is made as to whether the unicast session threshold is satisfied. In one embodiment, depicted and described herein with respect to FIG. 2 and FIG. 3, content provider server 104 maintains the unicast session threshold. In one embodiment, depicted and described herein with respect to FIG. 4, SIP application server 108 maintains the unicast session threshold. Although depicted and described as being maintained by content provider server 104 or SIP application server 108, the unicast session threshold may be maintained by various other network elements.

In one embodiment of the present invention, if less than N SIP clients have established unicast sessions for the requested content, a unicast session is established with the SIP client (denoted as SIP client $101_{1...N}$) in response to the session establishment request from SIP client $101_{1...N}$. If N SIP clients have established unicast sessions for the requested content, a multicast session is established with the SIP client (denoted as SIP client $101_{N+1}$) in response to the session establishment request from SIP $101_{N+1}$, and the N unicast sessions associated with SIP client $101_{1...N}$ are converted from respective unicast sessions to the established multicast session.

As such, a session establishment request from an (N+1)th SIP client (where associated SIP clients 1 through N have N existing unicast sessions, respectively, with content provider server 104, where each of the existing unicast sessions is established for providing the same media content) requesting establishment of an (N+1)th unicast session triggers establishment of a multicast session to SIP client $101_{N+1}$, as well as the join of each of the unicast sessions associated with SIP clients $101_{1...N}$ to the multicast session. The operation of SIP clients 101, SIP proxy server 102, content provider server 104, multicast server 106, and SIP application server 108 in converting unicast sessions into a multicast session is depicted and described with respect to FIG. 2, FIG. 3, and FIG. 4.

Figure 2:
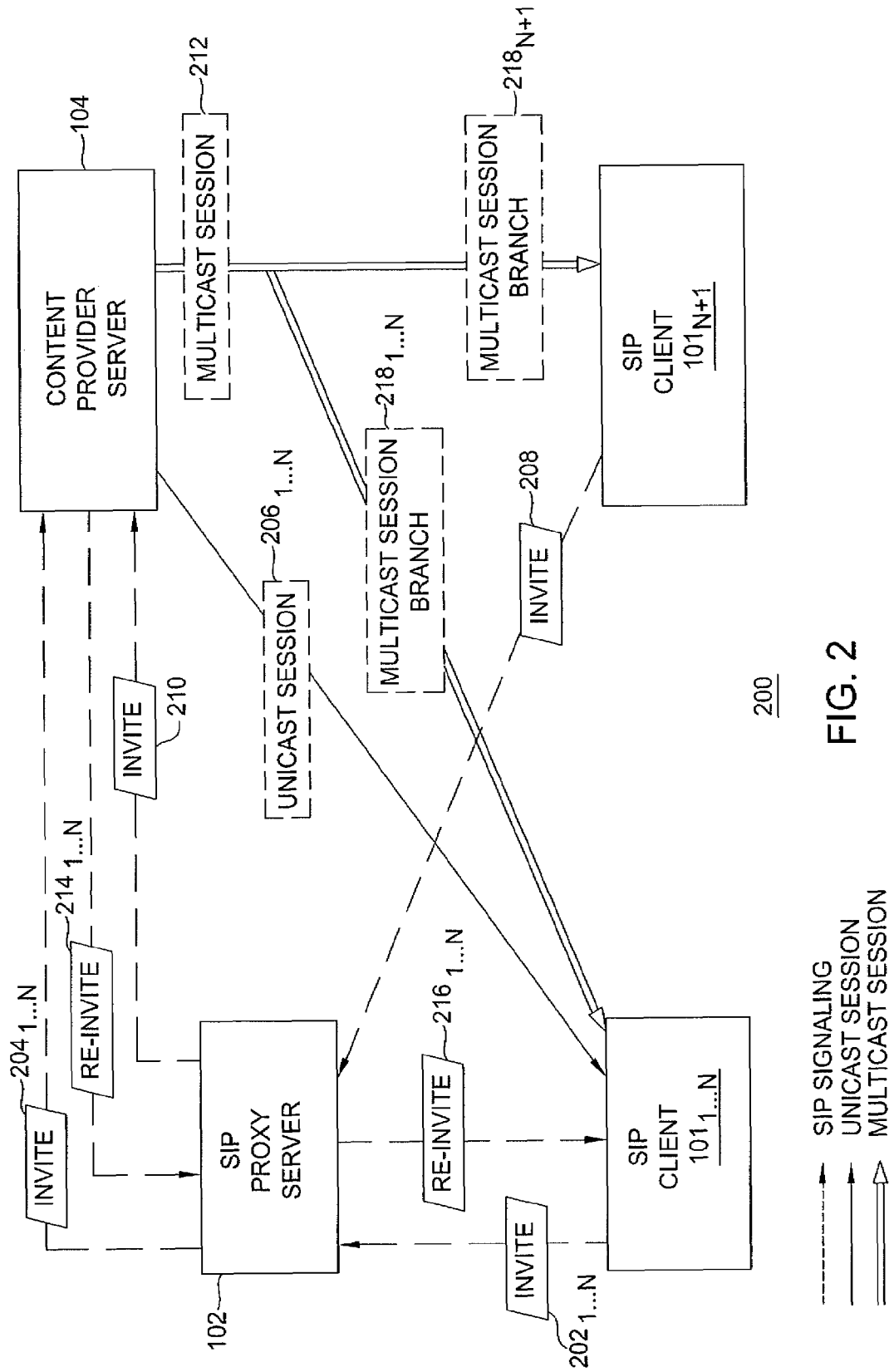
FIG. 2 depicts a high-level block diagram of a portion of the communications network architecture 100 of FIG. 1 according to one embodiment of the present invention.

FIG. 2 depicts a high-level block diagram of a portion of the communications network architecture 100 of FIG. 1 according to one embodiment of the present invention. The signaling depicted and described with respect to FIG. 2 is performed in accordance with one embodiment of the present invention. As depicted in FIG. 2, SIP clients $101_{1...N}$ and $101_{N+1}$, SIP proxy server 102, and content provider server 104 cooperate for converting a plurality of unicast sessions into a multicast session. For purposes of clarity, SIP INVITE and RE-INVITE signaling messages are displayed while other SIP signaling messages (e.g., TRYING, RINGING, 200 OK, ACK, and the like) are omitted. As depicted in FIG. 2, SIP signaling is represented using dashed-line connections, unicast session signaling is represented using single-line connections, and multicast session signaling is represented using double-line connections.

As depicted in FIG. 2, SIP client $101_{1...N}$ sends SIP INVITE message $202_{1...N}$ to SIP proxy server 102 indicating that SIP client $101_{1...N}$ is requesting establishment of a unicast session from content provider server 104. The SIP proxy server 102 sends SIP INVITE message $204_{1...N}$ (i.e., forwards SIP INVITE message $202_{1...N}$) to content provider server 104. Although depicted as individual SIP INVITE messages (i.e., SIP INVITE message $202_{1...N}$ and SIP INVITE message $204_{1...N}$), separate SIP INVITE messages $202_1$-$202_N$ (represented herein as SIP INVITE message $202_{1...N}$) are generated by SIP clients $101_1$-$101_N$ (represented herein as SIP client $101_{1...N}$), and separate SIP INVITE messages $204_1$-$204_N$ (represented herein as SIP INVITE message $204_{1...N}$) are forward to content provider server 104 by SIP proxy server 102.

Upon receiving SIP INVITE message $204_{1...N}$ from SIP proxy server 102, content provider server 104 establishes UNICAST SESSION $206_{1...N}$ with SIP client $101_{1...N}$. The UNICAST SESSION $206_{1...N}$ is adapted for delivering requested content from content provider server 104 to SIP client $101_{1...N}$. Although depicted as one UNICAST SESSION $206_{1...N}$, separate UNICAST SESSIONS $206_1$-$206_N$ (represented herein as UNICAST SESSION $206_{1...N}$) are associated with corresponding SIP clients $101_1$-$101_N$ (represented herein as SIP client $101_{1...N}$), respectively. Although any content may be delivered from content provider server 104 to SIP clients $101_1$-$101_N$ using corresponding UNICAST SESSIONS $206_1$-$206_N$, for purposes of clarity, UNICAST SESSIONS $206_1$-$206_N$ depicted in FIG. 2 are assumed to deliver identical content to each of SIP clients $101_1$-$101_N$, respectively.

As depicted in FIG. 2, at a time at which UNICAST SESSION $206_{1...N}$ exists between content provider server 104 and SIP client $101_{1...N}$, SIP client $101_{N+1}$ sends SIP INVITE message 208 to proxy server 102, thereby indicating that SIP client $101_{N+1}$ is requesting establishment of a unicast session from content provider server 104. The SIP proxy server 102 sends SIP INVITE message 210 (i.e., forwards SIP INVITE message 208) to content provider server 104. Upon receiving SIP INVITE message 210, content provider server 104 determines whether the unicast session threshold (described herein with respect to FIG. 1) is satisfied for the content requested from content provider server 104. Since, as depicted in FIG. 2, the unicast session threshold is satisfied (i.e., N unicast sessions exist with SIP clients $101_1$-$101_N$, respectively), content provider server 104 establishes a MULTICAST SESSION 212, having MULTICAST SESSION BRANCH $218_{N+1}$, with SIP client $101_{N+1}$ for delivering requested content from content provider server 104 to SIP client $101_{N+1}$.

In one embodiment of the present invention, upon establishment of MULTICAST SESSION 212 with SIP client $101_{N+1}$, content provider server 104 identifies (for the content requested by SIP client $101_{N+1}$) each SIP client having an existing unicast session with content provider server 104 (illustratively, SIP client $101_{1...N}$ having associated UNICAST SESSION $206_{1...N}$). The content provider server 104 generates SIP RE-INVITE message $214_{1...N}$ for SIP client $101_{1...N}$. The content provider server 104 sends SIP RE-INVITE message $214_{1...N}$ to SIP proxy server 102. The SIP proxy server 102 sends SIP RE-INVITE message $216_{1...N}$ (i.e., forwards SIP RE-INVITE message $214_{1...N}$) to SIP client $101_{1...N}$. Although depicted as one SIP RE-INVITE message (i.e., SIP RE-INVITE message $214_{1...N}$ and SIP RE-INVITE message $216_{1...N}$) separate SIP RE-INVITE messages $214_1$-$214_N$ and $216_1$-$216_N$ are associated with SIP clients $101_1$-$101_N$, respectively.

In one embodiment of the present invention, SIP RE-INVITE message $214_{1...N}$ and associated SIP RE-INVITE message $216_{1...N}$ are adapted for inviting SIP client $101_{1...N}$ to join MULTICAST SESSION 212 established between content provider server 104 and SIP client $101_{N+1}$ (i.e., adapted for converting UNICAST SESSION $206_{1...N}$ established with SIP client $101_{1...N}$ to corresponding multicast session branches of MULTICAST SESSION 212). Upon receiving SIP RE-INVITE MESSAGE $216_{1...N}$ from SIP proxy server 102, SIP client $101_{1...N}$ may join MULTICAST SESSION $212_{1...N}$ established between content provider server 104 and SIP client $101_{N+1}$ using one of a plurality of multicast session join techniques.

In one embodiment, SIP client $101_{1...N}$ joins MULTICAST SESSION BRANCH $218_{1...N}$ of MULTICAST SESSION 212 using standard multicast session join techniques as known in the art. In another embodiment, SIP client $101_{1...N}$ joins MULTICAST SESSION BRANCH $218_{1...N}$ of MULTICAST SESSION 212 using SIP signaling. Although described with respect to standard multicast session join techniques and SIP signaling, various other multicast session join techniques may be used in accordance with various embodiments of the present invention. Using such multicast session join techniques, content provider server 104 thereby forms MULTICAST SESSION BRANCH $218_{1...N}$ with SIP client $101_{1...N}$. The MULTICAST SESSION BRANCH $218_{N+1}$ associated with SIP client $101_{N+1}$ and MULTICAST SESSION BRANCH $218_{1...N}$ associated with SIP client $101_{1...N}$ collectively form MULTICAST SESSION 212.

Figure 3:
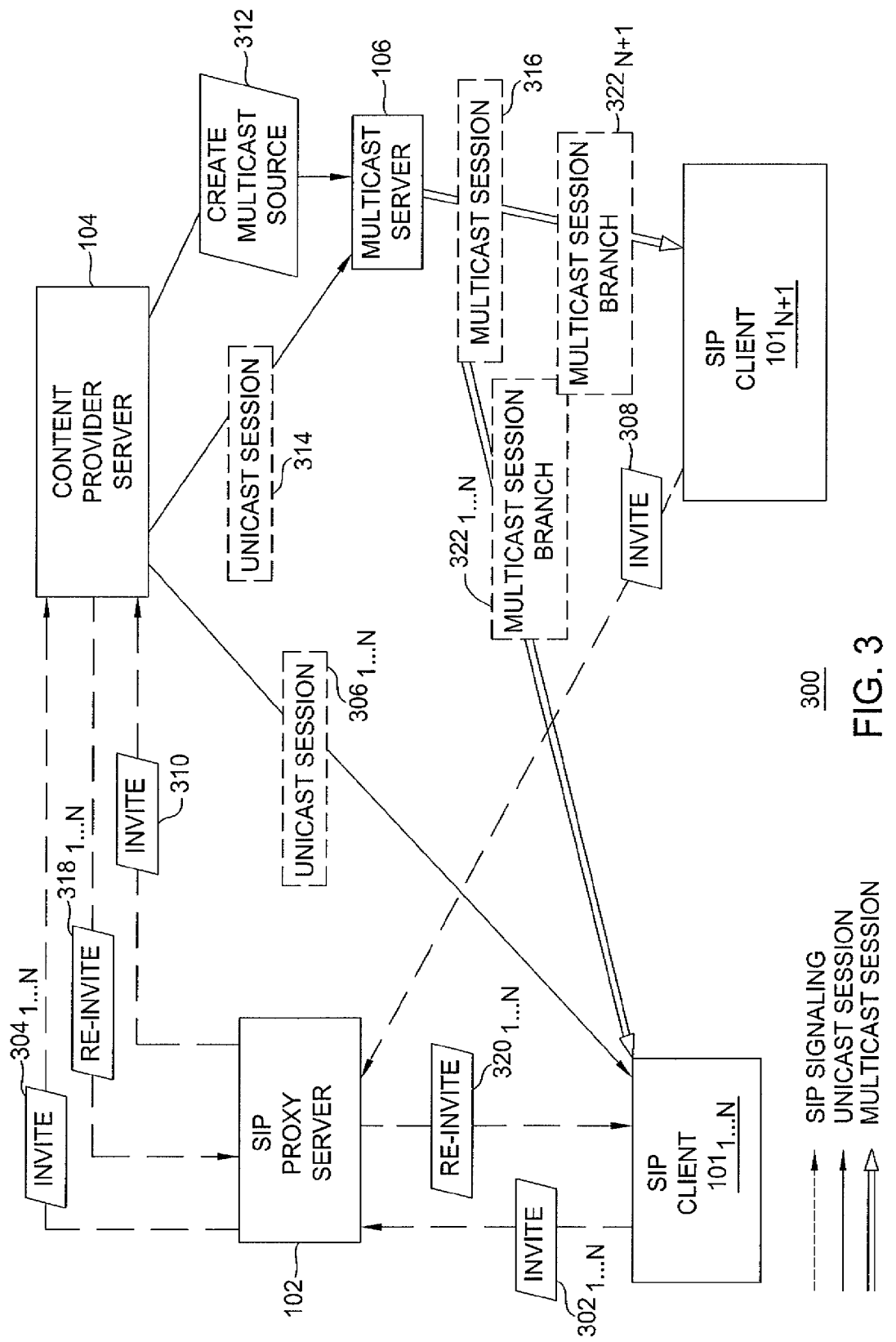
FIG. 3 depicts a high-level block diagram of a portion of the communications network architecture 100 of FIG. 1 according to one embodiment of the present invention.

FIG. 3 depicts a high-level block diagram of a portion of the communications network architecture 100 of FIG. 1 according to one embodiment of the present invention. The signaling depicted and described with respect to FIG. 3 is performed in accordance with one embodiment of the present invention. As depicted in FIG. 3, SIP clients $101_{1...N}$ and $101_{N+1}$, SIP proxy server 102, content provider server 104, and multicast server 106 cooperate for converting a plurality of unicast sessions into a multicast session. For purposes of clarity, SIP INVITE and RE-INVITE signaling messages are displayed while other SIP signaling messages (e.g., TRYING, RINGING, 200 OK, ACK, and the like) are omitted. As depicted in FIG. 3, SIP signaling is represented using dashed-line connections, unicast session signaling is represented using single-line connections, and multicast session signaling is represented using double-line connections.

As depicted in FIG. 3, SIP client $101_{1...N}$ sends SIP INVITE message $302_{1...N}$ to SIP proxy server 102 indicating that SIP client $101_{1...N}$ is requesting establishment of a unicast session from content provider server 104. The SIP proxy server 102 sends SIP INVITE message $304_{1...N}$ (i.e., forwards SIP INVITE message $302_{1...N}$) to content provider server 104. Although depicted as individual SIP INVITE messages (i.e., SIP INVITE message $302_{1...N}$ and SIP INVITE message $304_{1...N}$), separate SIP INVITE messages $302_1$-$302_N$ (represented herein as SIP INVITE message $302_{1...N}$) are generated by SIP clients $101_1$-$101_N$ (represented herein as SIP client $101_{1...N}$), and separate SIP INVITE messages $304_1$-$304_N$ (represented herein as SIP INVITE message $304_{1...N}$) are forwarded to content provider server 104 by SIP proxy server 102.

Upon receiving SIP INVITE message $304_{1...N}$ from SIP proxy server 102, content provider server 104 establishes UNICAST SESSION $306_{1...N}$ with SIP client $101_{1...N}$. The UNICAST SESSION $306_{1...N}$ is adapted for delivering requested content from content provider server 104 to SIP client 101$_{1...N}$. Although depicted as one UNICAST SESSION 306$_{1...N}$, separate UNICAST SESSIONS 306$_1$-306$_N$ (represented herein as UNICAST SESSION 306$_{1...N}$) are associated with corresponding SIP clients 101$_1$-101$_N$ (represented herein as SIP client 101$_{1...N}$), respectively. Although any content may be delivered from content provider server 104 to SIP clients 101$_1$-101$_N$ using corresponding UNICAST SESSIONS 306$_1$-306$_N$, for purposes of clarity, UNICAST SESSIONS 306$_1$-306$_N$ depicted in FIG. 3 are assumed to deliver identical content to each of SIP clients 101$_1$-101$_N$, respectively.

As depicted in FIG. 3, at a time at which UNICAST SESSION 306$_{1...N}$ exists between content provider server 104 and SIP client 101$_{1...N}$, SIP client 101$_{N+1}$ sends SIP INVITE message 308 to proxy server 102, thereby indicating that SIP client 101$_{N+1}$ is requesting establishment of a unicast session from content provider server 104. The SIP proxy server 102 sends SIP INVITE message 310 (i.e., forwards SIP INVITE message 308) to content provider server 104. Upon receiving SIP INVITE message 310, content provider server 104 determines whether the unicast session threshold (described herein with respect to FIG. 1) is satisfied for the content requested from content provider server 104. As depicted in FIG. 3, the unicast session threshold is satisfied (i.e., N unicast sessions exist with SIP clients 101$_1$-101$_N$, respectively).

Since, as depicted in FIG. 3, the unicast session threshold is satisfied content provider server 104 sends CREATE MULTICAST SOURCE message 312 to multicast server 106. As depicted in FIG. 3, CREATE MULTICAST SOURCE message 312 is adapted for configuring multicast server 106 as the source of a multicast session by which the requested content is provided to SIP client 101$_{N+1}$ (and, following conversion of UNICAST SESSION 306$_{1...N}$ to the multicast session, to SIP client 101$_{1...N}$). Upon receiving CREATE MULTICAST SOURCE message 312, multicast server 106 establishes a MULTICAST SESSION 316, having MULTICAST SESSION BRANCH 322$_{N+1}$, with SIP client 101$_{N+1}$ for delivering requested content from content provider server 104 to SIP client 101$_{N+1}$.

During generation and transmission of CREATE MULTICAST SOURCE message 312 to multicast server 106, and processing of CREATE MULTICAST SOURCE message 312 by multicast server 106 for establishing MULTICAST SESSION 316, content provider server 104 establishes a UNICAST SESSION 314 with multicast server 106. The content provider server 104 delivers requested content to multicast server 106 using UNICAST SESSION 314. The multicast server 106 forwards the requested content delivered by content provider server 104 to SIP client 101$_{N+1}$ using MULTICAST SESSION BRANCH 322$_{N+1}$ of MULTICAST SESSION 316. As such, content provider server 104 is not configured as the multicast source for MULTICAST SESSION 316; rather, content provider server 104 configures multicast server 106 as the multicast source for MULTICAST SESSION 316 using CREATE MULTICAST SOURCE message 312.

In one embodiment of the present invention, upon establishment of UNICAST SESSION 314 with multicast server 106 (as well as establishment of MULTICAST SESSION 316 between multicast server 106 and SIP client 101$_{N+1}$) content provider server 104 identifies (for the content requested by SIP client 101$_{N+1}$) each SIP client having an existing unicast session with content provider server 104 (illustratively, SIP client 101$_{1...N}$ having associated UNICAST SESSION 306$_{1...N}$). The content provider server 104 generates SIP RE-INVITE message 318$_{1...N}$ for SIP client 101$_{1...N}$. The content provider server 104 sends SIP RE-INVITE message 318$_{1...N}$ to SIP proxy server 102. The SIP proxy server 102 sends SIP RE-INVITE message 320$_{1...N}$ (i.e., forwards SIP RE-INVITE message 318$_{1...N}$) to SIP client 101$_{1...N}$. Although depicted as one SIP RE-INVITE message (i.e., SIP RE-INVITE message 318$_{1...N}$ and SIP RE-INVITE message 320$_{1...N}$) separate SIP RE-INVITE messages 318$_1$-318$_N$ and 320$_1$-320$_N$ are associated with SIP clients 101$_1$-101$_N$, respectively.

In one embodiment of the present invention, SIP RE-INVITE message 318$_{1...N}$ and associated SIP RE-INVITE message 320$_{1...N}$ are adapted for inviting SIP client 101$_{1...N}$ to join MULTICAST SESSION 316 established between multicast server 106 and SIP client 101$_{N+1}$ (i.e., adapted for converting UNICAST SESSION 306$_{1...N}$ established between content provider server 104 and SIP client 101$_{1...N}$ to corresponding multicast session branches of MULTICAST SESSION 316 between multicast server 106 and SIP client 101$_{1...N}$). Upon receiving SIP RE-INVITE MESSAGE 320$_{1...N}$ from SIP proxy server 102, SIP client 101$_{1...N}$ may join MULTICAST SESSION 316 established between multicast server 106 and SIP client 101$_{N+1}$ using one of a plurality of multicast session join techniques.

In one embodiment, SIP client 101$_{1...N}$ joins MULTICAST SESSION BRANCH 322$_{1...N}$ of MULTICAST SESSION 316 using standard multicast session join techniques as known in the art. In another embodiment, SIP client 101$_{1...N}$ joins MULTICAST SESSION BRANCH 322$_{1...N}$ of MULTICAST SESSION 316 using SIP signaling. Although described with respect to standard multicast session join techniques and SIP signaling, various other multicast session join techniques may be used in accordance with one embodiment of the present invention. Using such multicast session join techniques, multicast server 106 thereby forms MULTICAST SESSION BRANCH 322$_{1...N}$ with SIP client 101$_{1...N}$. The MULTICAST SESSION BRANCH 322$_{N+1}$ associated with SIP client 101$_{N+1}$ and MULTICAST SESSION BRANCH 322$_{1...N}$ associated with SIP client 101$_{1...N}$ collectively form MULTICAST SESSION 316.

Figure 4:
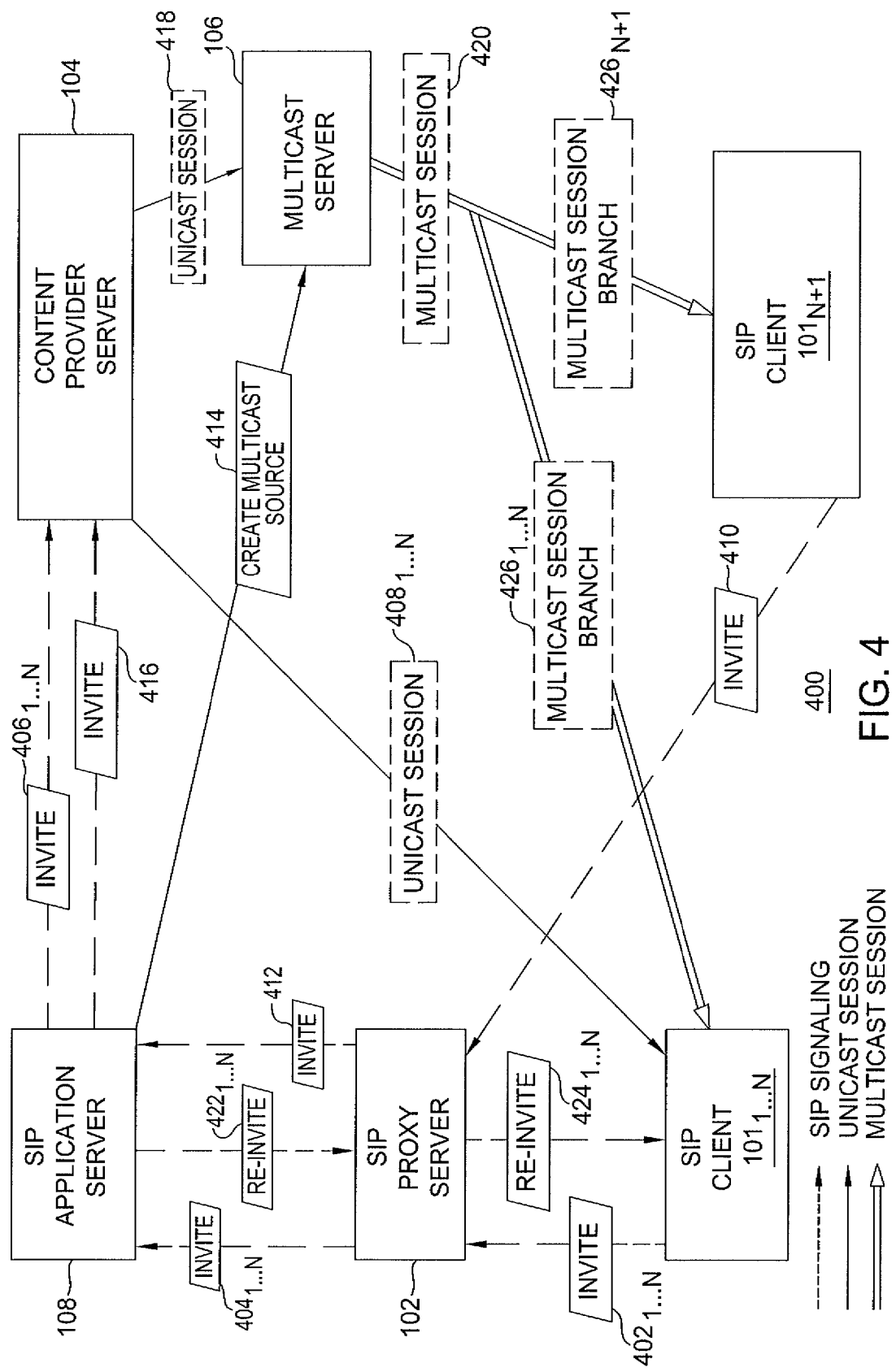
FIG. 4 depicts a high-level block diagram of a portion of the communications network architecture 100 of FIG. 1 according to one embodiment of the present invention.

FIG. 4 depicts a high-level block diagram of a portion of the communications network architecture 100 of FIG. 1 according to one embodiment of the present invention. The signaling depicted and described with respect to FIG. 4 is performed in accordance with one embodiment of the present invention. As depicted in FIG. 4, SIP clients 101$_{1...N}$ and 101$_{N+1}$, SIP proxy server 102, content provider server 104, multicast server 106, and SIP application server 108 cooperate for converting a plurality of unicast sessions into a multicast session. For purposes of clarity, SIP INVITE and RE-INVITE signaling messages are displayed while other SIP signaling messages (e.g., TRYING, RINGING, 200 OK, ACK, and the like) are omitted. As depicted in FIG. 4, SIP signaling is represented using dashed-line connections, unicast session signaling is represented using single-line connections, and multicast session signaling is represented using double-line connections.

As depicted in FIG. 4, SIP client 101$_{1...N}$ sends SIP INVITE message 402$_{1...N}$ to SIP proxy server 102 indicating that SIP client 101$_{1...N}$ is requesting establishment of a unicast session from content provider server 104. The SIP proxy server 102 sends SIP INVITE message 404$_{1...N}$ (i.e., forwards SIP INVITE message 402$_{1...N}$) to SIP application server 108. The SIP application server 108 sends SIP INVITE message 406$_{1...N}$ (i.e., forwards SIP INVITE message 404$_{1...N}$) to content provider server 104. Although depicted as individual SIP INVITE messages (i.e., SIP INVITE message 402$_{1...N}$, 404$_{1...N}$, and 406$_{1...N}$), separate SIP INVITE messages $402_1$-$402_N$ are generated by SIP clients $101_1$-$101_N$, separate SIP INVITE messages $404_1$-$404_N$ are forwarded to SIP application server 108 by SIP proxy server 102, and separate SIP INVITE messages $304_1$-$304_N$ are forward to content provider server 104 by SIP application server 108.

Upon receiving SIP INVITE message $406_{1\ldots N}$ from SIP application server 108, content provider server 104 establishes UNICAST SESSION $408_{1\ldots N}$ with SIP client $101_{1\ldots N}$. The UNICAST SESSION $408_{1\ldots N}$ is adapted for delivering requested content from content provider server 104 to SIP client $101_{1\ldots N}$. Although depicted as one UNICAST SESSION $408_{1\ldots N}$, separate UNICAST SESSIONS $408_1$-$408_N$ (represented herein as UNICAST SESSION $408_{1\ldots N}$) are associated with corresponding SIP clients $101_1$-$101_N$ (represented herein as SIP client $101_{1\ldots N}$), respectively. Although any content may be delivered from content provider server 104 to SIP clients $101_1$-$101_N$ using corresponding UNICAST SESSIONS $408_1$-$408_N$, for purposes of clarity, UNICAST SESSIONS $408_1$-$408_N$ depicted in FIG. 4 are assumed to deliver identical content to each of SIP clients $101_1$-$101_N$, respectively.

As depicted in FIG. 4, at a time at which UNICAST SESSION $408_{1\ldots N}$ exists between content provider server 104 and SIP client $101_{1\ldots N}$, SIP client $101_{N+1}$ sends SIP INVITE message 410 to SIP proxy server 102, thereby indicating that SIP client $101_{N+1}$ is requesting establishment of a unicast session from content provider server 104. The SIP proxy server 102 sends SIP INVITE message 412 (i.e., forwards SIP INVITE message 410) to SIP application server 108. Upon receiving SIP INVITE message 412, SIP application server 108 determines whether the unicast session threshold (described herein with respect to FIG. 1) is satisfied for the content requested from content provider server 104. As depicted in FIG. 4, the unicast session threshold is satisfied (i.e., N unicast sessions exist with SIP clients $101_1$-$101_N$, respectively).

Since, as depicted in FIG. 4, the unicast session threshold is satisfied, SIP application server 108 sends CREATE MULTICAST SOURCE message 414 to multicast server 106. As depicted in FIG. 4, CREATE MULTICAST SOURCE message 414 is adapted for configuring multicast server 106 as the source of a multicast session by which the requested content is provided to SIP client $101_{N+1}$ (and, following conversion of UNICAST SESSION $408_{1\ldots N}$ to the multicast session, to SIP client $101_{1\ldots N}$). During generation and transmission of CREATE MULTICAST SOURCE message 414 to multicast server 106, and processing of CREATE MULTICAST SOURCE message 414 by multicast server 106 for establishing a multicast session (illustratively, MULTICAST SESSION 420), SIP application server 108 sends a SIP INVITE message 416 to content provider server 104.

Upon receiving SIP INVITE message 416 from SIP application server 108, content provider server 104 establishes a UNICAST SESSION 418 with multicast server 106. During generation and transmission of SIP INVITE message 416 to content provider server 104, and establishment of UNICAST SESSION 418 from content provider server 104 to multicast server 106, multicast server 106 establishes a MULTICAST SESSION 420, having MULTICAST SESSION BRANCH $426_{N+1}$, with SIP client $101_{N+1}$ for delivering requested content from content provider server 104 to SIP client $101_{N+1}$. In one embodiment, multicast server 106 generates MULTICAST SESSION 420 in response to CREATE MULTICAST SOURCE message 414 and establishment of UNICAST SESSION 418 by content provider server 104.

As depicted in FIG. 4, content provider server 104 delivers requested content to multicast server 106 using UNICAST SESSION 418. The multicast server 106 forwards the requested content delivered by content provider server 104 to SIP client $101_{N+1}$ using MULTICAST SESSION BRANCH $426_{N+1}$ of MULTICAST SESSION 420. As such, content provider server 104 is not configured as the multicast source for MULTICAST SESSION 420; rather, SIP application server 108 (in cooperation with content provider server 104) configures multicast server 106 as the multicast source for MULTICAST SESSION 420. As such, requested content intended for SIP client $101_{N+1}$ is provided from content provider server 104 to SIP client 101 using UNICAST SESSION 418 and MULTICAST SESSION 420.

In one embodiment of the present invention, upon establishment of UNICAST SESSION 418 with multicast server 106 (as well as establishment of MULTICAST SESSION 420 between multicast server 106 and SIP client $101_{N+1}$) SIP application server 108 identifies (for the content requested by SIP client $101_{N+1}$) each SIP client having an existing unicast session with content provider server 104 (illustratively, SIP client $101_{1\ldots N}$ having associated UNICAST SESSION $408_{1\ldots N}$). The SIP application server 108 generates SIP RE-INVITE message $422_{1\ldots N}$ for SIP client $101_{1\ldots N}$. The SIP application server 104 sends SIP RE-INVITE message $422_{1\ldots N}$ to SIP proxy server 102. The SIP proxy server 102 sends SIP RE-INVITE message $424_{1\ldots N}$ (i.e., forwards SIP RE-INVITE message $422_{1\ldots N}$) to SIP client $101_{1\ldots N}$. Although depicted as one SIP RE-INVITE message (i.e., SIP RE-INVITE message $422_{1\ldots N}$ and SIP RE-INVITE message $424_{1\ldots N}$) separate SIP RE-INVITE messages $422_1$-$422_N$ and $424_1$-$424_N$ are associated with SIP clients $101_1$-$101_N$, respectively.

In one embodiment of the present invention, SIP RE-INVITE message $422_{1\ldots N}$ and associated SIP RE-INVITE message $424_{1\ldots N}$ are adapted for inviting SIP client $101_{1\ldots N}$ to join MULTICAST SESSION 420 established between multicast server 106 and SIP client $101_{N+1}$ (i.e., adapted for converting UNICAST SESSION $408_{1\ldots N}$ established between content provider server 104 and SIP client $101_{1\ldots N}$ to corresponding multicast session branches of MULTICAST SESSION 420 between multicast server 106 and SIP client $101_{1\ldots N}$). Upon receiving SIP RE-INVITE MESSAGE $424_{1\ldots N}$ from SIP proxy server 102, SIP client $101_{1\ldots N}$ may join MULTICAST SESSION 420 established between multicast server 106 and SIP client $101_{N+1}$ using one of a plurality of multicast session join techniques.

In one embodiment, SIP client $101_{1\ldots N}$ joins MULTICAST SESSION BRANCH $426_{1\ldots N}$ of MULTICAST SESSION 420 using standard multicast session join techniques as known in the art. In another embodiment, SIP client $101_{1\ldots N}$ joins MULTICAST SESSION BRANCH $426_{1\ldots N}$ of MULTICAST SESSION 420 using SIP signaling. Although described with respect to standard multicast session join techniques and SIP signaling, various other multicast session join techniques may be used in accordance with one embodiment of the present invention. Using such multicast session join techniques, multicast server 106 thereby forms MULTICAST SESSION BRANCH $426_{1\ldots N}$ with SIP client $101_{1\ldots N}$. The MULTICAST SESSION BRANCH $426_{N+1}$ associated with SIP client $101_{N+1}$ and MULTICAST SESSION BRANCH $426_{1\ldots N}$ associated with SIP client $101_{1\ldots N}$ collectively form MULTICAST SESSION 420.

Although not depicted with respect to FIG. 4, receiving a SIP 200 OK message from SIP client $10_{1\ldots N}$ triggers a SIP BYE message from SIP application server 108 to content provider server 104. In one embodiment, a SIP BYE message from the (N+1)th SIP client $101_{N+1}$ should not be forwarded to content provider server 104 since it would drop the multicast stream. In this embodiment, the SIP BYE message from SIP client $101_{N+1}$ may be cached (e.g., in SIP application server 108) until a condition is satisfied, at which point the SIP BYE message from SIP client $101_{N+1}$ is delivered to content provider server 104. In this embodiment, the condition may comprise a determination that all SIP clients 101 have sent associated SIP BYE messages for leaving the multicast session, until a decision is made to convert the multicast session back to a plurality of unicast sessions, and the like, as well as various combinations thereof.

Figure 5:
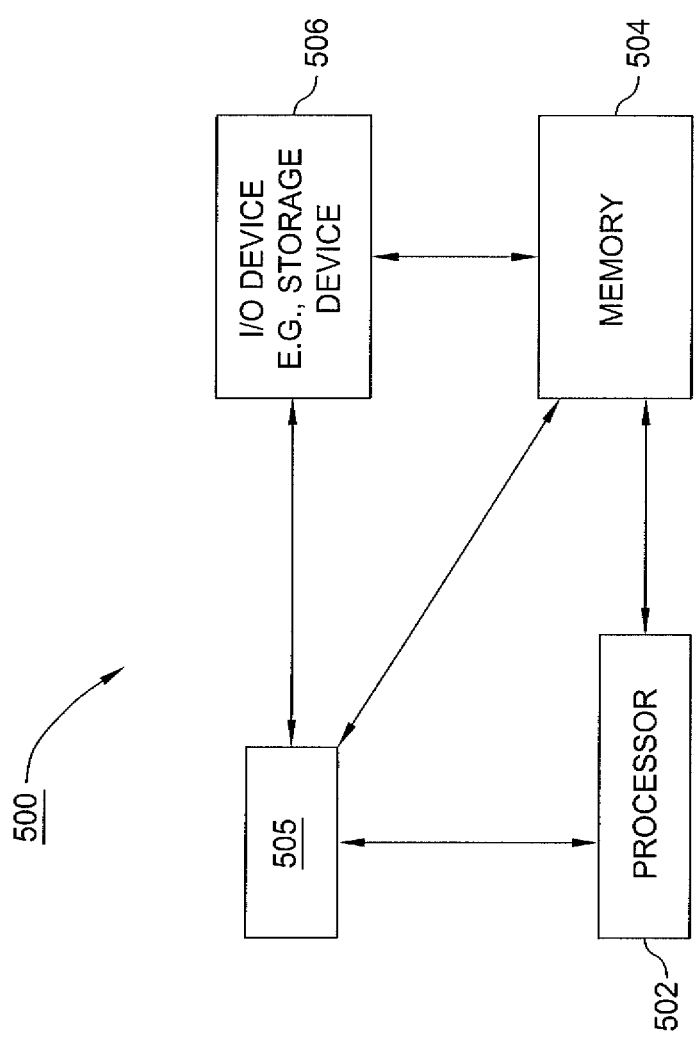
FIG. 5 depicts a high-level block diagram of a general-purpose computer suitable for use in performing the functions described herein.

FIG. 5 depicts a high-level block diagram of a general purpose computer suitable for use in performing the functions described herein. As depicted in FIG. 4, system 500 comprises a processor element 502 (e.g., a CPU), a memory 504, e.g., random access memory (RAM) and/or read only memory (ROM), a SIP session conversion module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present SIP session conversion module or process 505 can be loaded into memory 504 and executed by processor 502 to implement the functions as discussed above. As such, SIP session conversion process 505 (including associated data structures) of the present invention can be stored on a computer readable medium or carrier, e.g., RAM memory, magnetic or optical drive or diskette and the like.

Although primarily described herein with respect to conversion of a plurality of unicast sessions into one multicast session, in one embodiment of the present invention, a plurality of unicast sessions may be converted into a plurality of multicast sessions. For example, in one embodiment, following a determination that the unicast session threshold has been satisfied, the existing unicast sessions may be converted into two multicast sessions, three multicast session, and the like. In one such embodiment, the number of multicast sessions into which the plurality of unicast sessions is converted may depend upon the unicast session threshold. In one embodiment, following conversion of a plurality of unicast sessions into a multicast session, subsequent requests for establishment of unicast requests for the content may be served through creation of additional unicast sessions, rather than joining the client devices to the existing multicast session. Upon satisfying the unicast session threshold, the client devices may then be converted to another multicast session.

In another such embodiment, the number of multicast sessions into which the plurality of unicast sessions is converted may depend upon the encoder-decoder (codec) types associated with each of the unicast sessions. In this embodiment, clients associated with the unicast session being converted into the multicast sessions may be grouped according to codec type. In one such embodiment, a multicast session may then be created for each codec type group (i.e., each codec type group has a different associated multicast session). In another such embodiment, a multicast session may then be created for one or more codec type groups (i.e., codec type groups may be further grouped together such that clients associated with a plurality of codec type groups all belong to the same multicast session).

Although primarily described herein with respect to conversion of unicast sessions into a multicast session, in one embodiment of the present invention, a multicast session may be converted into a plurality of individual unicast sessions. In one embodiment, a method for converting a multicast session into a plurality of unicast sessions includes receiving a message requesting termination of an association of a first client device with the multicast session, and, in response to a determination that a threshold number of other client devices are associated with the multicast session, generating at least one unicast session join message for the other client devices, the at least one unicast session join message adapted for enabling the other client devices to establish respective unicast sessions for receiving the requested content.

In one embodiment, in which a multicast session is converted into a plurality of individual unicast sessions, a multicast session threshold (denoted as M) may be used for conversion of the multicast session into a plurality of unicast session. Upon detecting termination of a multicast branch of an existing multicast session, a determination is made as to whether the multicast session threshold is satisfied. If greater than M SIP clients belong to the multicast session after the termination of the multicast branch, the multicast session is maintained. If M SIP clients belong to the multicast session after the termination of the multicast branch, the multicast session is converted into M individual unicast sessions.

Although primarily described herein with respect to specific configurations of SIP-enabled network elements, those skilled in the art will appreciate the methodologies of the present invention may be adapted for use with various other configurations of SIP-enabled network elements. Although primarily described herein with respect to SIP signaling, those skilled in the art will appreciate the methodologies of the present invention may be adapted for use with various other signaling protocols. Although primarily described herein with respect to signaling within an IP network, those skilled in the art will appreciate the methodologies of the present invention may be adapted for use with various other networks. As such, conversion of unicast sessions into a multicast session in accordance with various embodiments of the present invention is not intended to be limited by node configuration, signaling protocol, network type, content type, or any other technology specific implementation.

Although various embodiments which incorporate the teachings of the present invention have been shown and described in detail herein, those skilled in the art can readily devise many other varied embodiments that still incorporate these teachings.

What is claimed is:

1. A method for converting a plurality of unicast sessions to a multicast session using Session Initiation Protocol (SIP), comprising:

receiving, at a content server, a request by a client device for content available from the content server;

in response to the request by the client device, determining whether a threshold number of unicast sessions exist for delivering the content to other client devices; and in response to a determination that a threshold number of unicast sessions exist for the content:

establishing a multicast session for delivering the content, wherein the multicast session is established by the content server;

generating a multicast session message for enabling the client device to join the multicast session, and propagating the multicast session message toward a SIP server configured to propagate the multicast session message toward the client device; and generating at least one multicast session join message for enabling the other client devices to join the multicast session, and propagating the at least one multicast session join message toward a SIP server configured to propagate the at least one multicast session join message toward the other client devices.

2. The method of claim 1, wherein the multicast session message comprises a SIP RE-INVITE message.

3. The method of claim 1, wherein generating a multicast session message comprises:
determining a multicast session identifier of the established multicast session; and
generating a multicast session message comprising the multicast session identifier.

4. The method of claim 1, further comprising:
transmitting the multicast session message from the SIP server toward the client device for use by the client device in joining the multicast session.

5. The method of claim 1, wherein each of the at least one multicast session join message comprises a SIP INVITE message.

6. The method of claim 1, further comprising:
transmitting the at least one multicast session join message from the SIP server toward the other client devices.

7. The method of claim 6, further comprising:
initiating, from each of the other client devices, signaling for enabling each of the other client devices to join the multicast session;
wherein the signaling for enabling each of the other client device to join the multicast session terminates the unicast sessions associated with each of the other client devices.

8. The method of claim 1, wherein the multicast session message and the at least one multicast join message are generated by the content server.

9. The method of claim 1, further comprising:
receiving, from a first client device of a plurality of client devices associated with a multicast session, a message requesting termination of an association of the first client device with the multicast session; and
generating, for a second client device of the plurality of client devices associated with the multicast session, a unicast session join message for enabling the second client device to establish a unicast session for receiving the content.

10. An apparatus for converting a plurality of unicast sessions to a multicast session using Session Initiation Protocol (SIP), comprising:
a processor configured to:
receive, at a content server, a request by a client device for content available from the content server;
in response to the request by the client device, determine whether a threshold number of unicast sessions exist for delivering the content to other client devices; and
in response to a determination that a threshold number of unicast sessions exist for the content:
establish a multicast session for delivering the content, wherein the multicast session is established by the content server;
generate a multicast session message for enabling the client device to join the multicast session, and propagate the multicast session message toward a SIP server configured to propagate the multicast session message toward the client device; and
generate at least one multicast session join message for enabling the other client devices to join the multicast session, and propagate the at least one multicast session join message toward a SIP server configured to propagate the at least one multicast session join message toward the other client devices.

11. A method for converting a plurality of unicast sessions to a multicast session using Session Initiation Protocol (SIP), comprising:
receiving, at a content server, a request by a client device for content available from the content server;
in response to the request by the client device, determining whether a threshold number of unicast sessions exist for delivering the content to other client devices; and
in response to a determination that a threshold number of unicast sessions exist for the content:
generating, by the content server, a multicast source establishment message for causing a multicast server to operate as a multicast session source for delivering the content to the client devices using a multicast session, and propagating the multicast source establishment message toward the multicast server; and
generating at least one multicast session join message for enabling the other client devices to join the multicast session, and propagating the at least one multicast session join message toward a SIP server configured to propagate the at least one multicast session join message toward the other client devices.

12. The method of claim 11, further comprising:
receiving the multicast source establishment message at the multicast server; and
in response to receiving the multicast source establishment message at the multicast server, establishing the multicast session.

13. The method of claim 11, further comprising:
establishing a unicast session from the content server to the multicast server for providing the content to the multicast server.

14. The method of claim 11, further comprising:
generating a multicast session message for enabling the client device to join the multicast session; and
propagating the multicast session message toward a SIP server configured to propagate the multicast session message toward the client device.

15. The method of claim 14, wherein the multicast session message is a SIP RE-INVITE message.

16. The method of claim 11, further comprising:
transmitting the at least one multicast session join message from the SIP server toward the other client devices.

17. The method of claim 16, further comprising:
initiating, from each of the other client devices, signaling for enabling each of the other client devices to join the multicast session;
wherein the signaling for enabling each of the other client device to join the multicast session terminates the unicast sessions associated with each of the other client devices.

18. The method of claim 11, wherein the at least one multicast session join message is generated by the content server.

19. The method of claim 11, further comprising:
receiving, from a first client device of a plurality of client devices associated with a multicast session, a message requesting termination of an association of the first client device with the multicast session; and
generating, for a second client device of the plurality of client devices associated with the multicast session, a unicast session join message for enabling the second client device to establish a unicast session for receiving the content.

20. An apparatus for converting a plurality of unicast sessions to a multicast session using Session Initiation Protocol (SIP), comprising:
a processor configured to:
receive, at a content server, a request by a client device for content available from the content server;
in response to the request by the client device, determine whether a threshold number of unicast sessions exist for delivering the content to other client devices; and
in response to a determination that a threshold number of unicast sessions exist for the content:
generate, by the content server, a multicast source establishment message for causing a multicast server to operate as a multicast session source for delivering the content to the client devices using a multicast session, and propagate the multicast source establishment message toward the multicast server; and
generate at least one multicast session join message for enabling the other client devices to join the multicast session, and propagate the at least one multicast session join message toward a SIP server configured to propagate the at least one multicast session join message toward the other client devices.

* * * * *